Nov. 15, 1927.

T. M. FINLEY ET AL 1,649,518

VALVE GEAR

Original Filed Jan. 14, 1920   6 Sheets-Sheet 5

Inventors
T. M. Finley.
A. W. Brown.
By Harry F. Riley Attorney

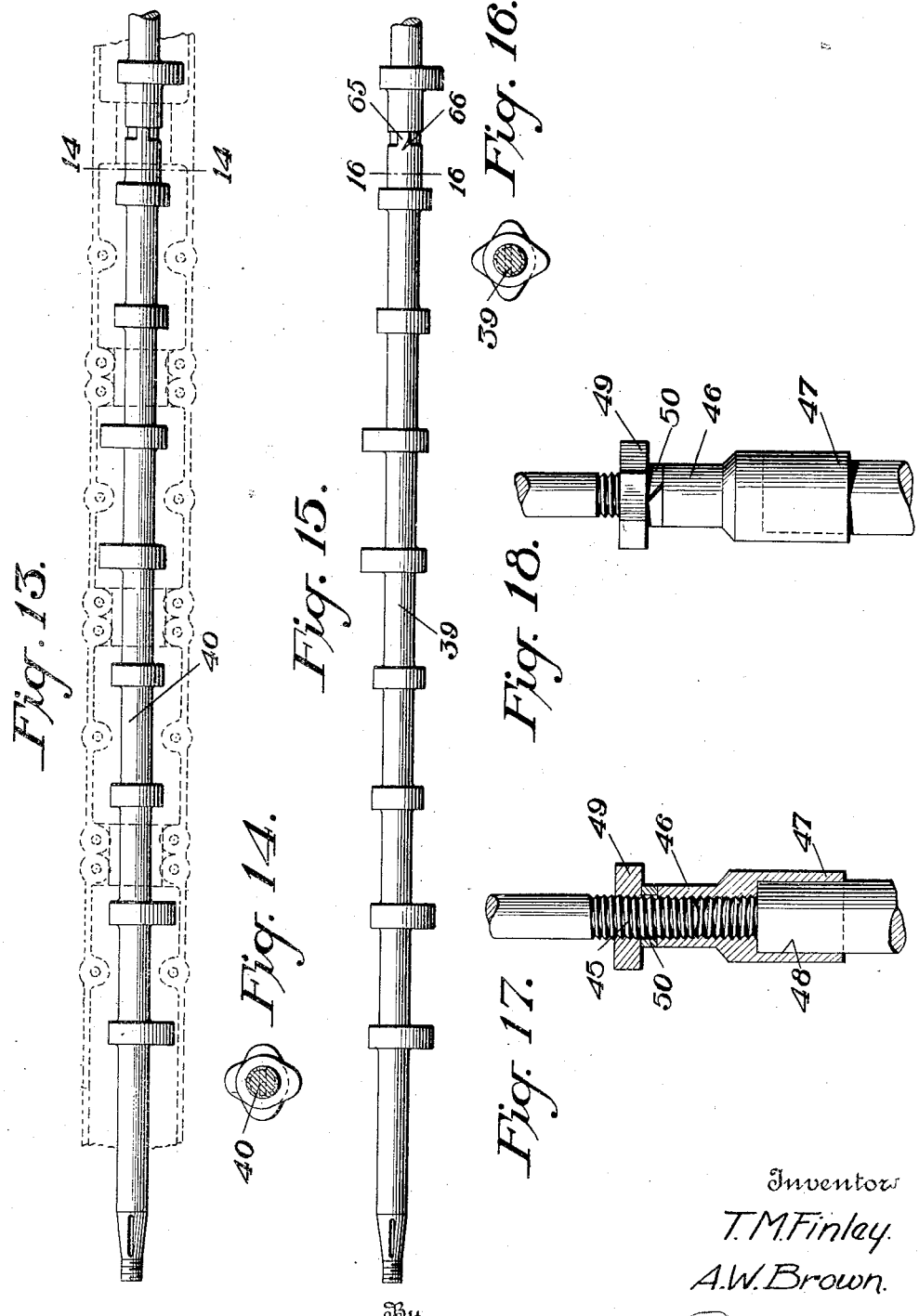

Patented Nov. 15, 1927.

1,649,518

UNITED STATES PATENT OFFICE.

THOMAS MILTON FINLEY AND ALLEN W. BROWN, OF ST. LOUIS, MISSOURI.

VALVE GEAR.

Original application filed January 14, 1920, Serial No. 351,346. Divided and this application filed January 14, 1920. Serial No. 351,349.

The invention relates to a valve gear for engines and is a division of an application filed by us the 14th day of January, 1920, Serial No. 351,346.

The object of the present invention is to improve the construction of valve gear and to provide a simple, practical and efficient valve gear of strong and durable construction designed particularly for use in connection with the aeronautical engine of the aforesaid application, but capable of being advantageously employed for operating the valves of various types of engines and of positively operating inlet and exhaust valves arranged in pairs to afford a freer inlet of the fuel charges and a freer exhaust of the burnt gases whereby the engine will be adapted to function perfectly and operate with maximum efficiency at high speeds and for extended periods.

A further object of the invention is to provide a valve gear of this character equipped with half-time gearing employing relatively small gear wheels which will be practically noiseless and in which the friction incident to such gearing will be reduced to a minimum and the durability and efficiency of the gearing correspondingly increased with the decrease of the tooth speed.

It is also an object of the invention to provide valve gear capable of ready adjustment to effect the desired movement of the inlet and exhaust valves and capable also of ready removal for repair and replacement of the parts.

Another object of the invention is to enable the half-time gearing of the valve mechanism to be employed for operating the pumps of the cooling system and the magnetos of the ignition of the engine.

With these and other objects in view, the invention consists in the construction and novel combination and arrangement of parts hereinafter fully described, illustrated in the accompanying drawings and pointed out in the claims hereto appended, it being understood that various changes in the form, proportion, and minor details of construction within the scope of the claims may be resorted to without departing from the spirit or sacrificing any of the advantages of the invention.

In the drawings, in which like characters of reference designate corresponding parts in the several figures.

Figure 1:
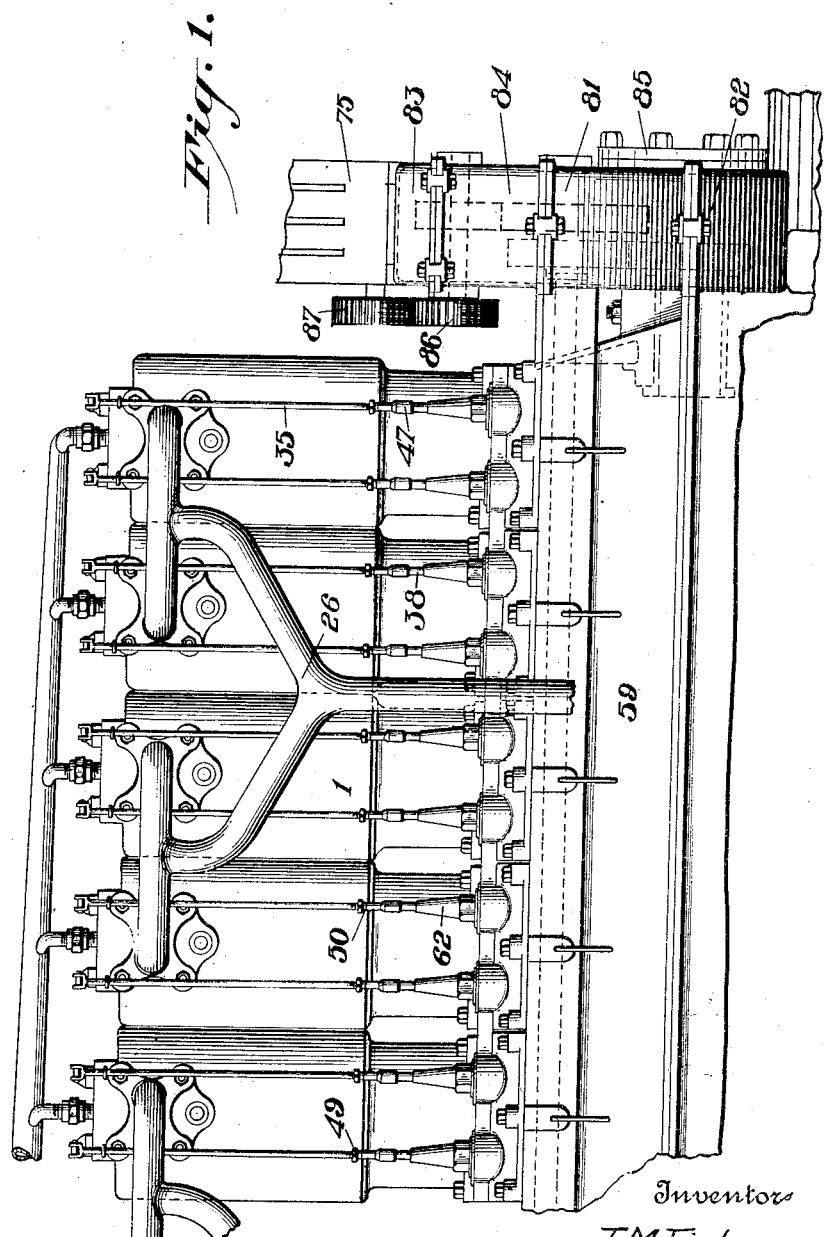
Figure 1 is a side elevation of a portion of a tandem motor power unit of the aforesaid application provided with valve gear constructed in accordance with this invention.
Figure 2:
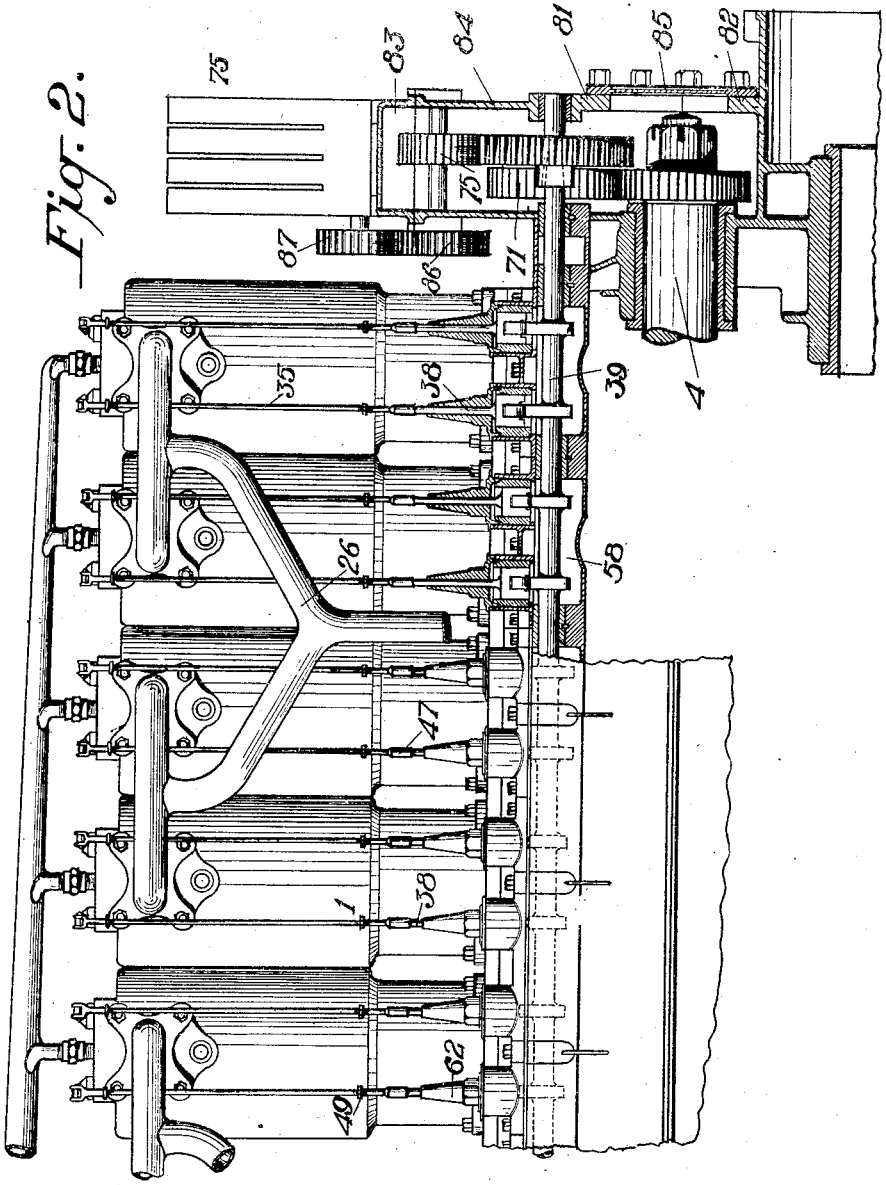
Figure 2 is a longitudinal sectional view through the cam housings of the admission cam shaft.

Figures 9 to 12 inclusive are detail views of the sleeve for guiding the lower end of the cam actuated rods.

Figure 13 is a plan view of the exhaust cam shaft.

Figure 14 is an end view of the same.

Figure 15 is a plan view of the admission cam shaft.

Figure 16 is an end view of the same.

Figures 17 and 18 are detail views illustrating the adjustable joint or connection between the cam actuated rods and the push rods.

In the accompanying drawings in which is illustrated one embodiment of the invention the valve gear is shown applied to the tandem motor power unit of the aforesaid application and only so much of the construction of the latter will be shown and described as will be necessary to a full and clear understanding of the valve gear. The tandem motor power unit is of the four cycle type and the cylinders 1, which are arranged vertically and in alignment receive pistons 2 which are connected by connecting rods 3 with the crank shafts 4. The crank shafts 4 of the two engine sections as fully shown and described in the said application are arranged in alignment and are coupled at their inner ends.

Each cylinder is equipped with a pair of inlet and exhaust valves 5 and 6 to enable it to perform its cycle of operations more completely at high speed than would be possible were only a single inlet and exhaust valve employed for each cylinder, as the pairs of valves enable the charges to be quickly introduced into the cylinders at the proper time and cause the burnt gases to be thoroughly exhausted with less heating of the valves and the adjacent parts and with a minimum liability of permitting unexhausted gases to mix with the incoming charge of fuel and impair the efficiency thereof.

Figure 3:
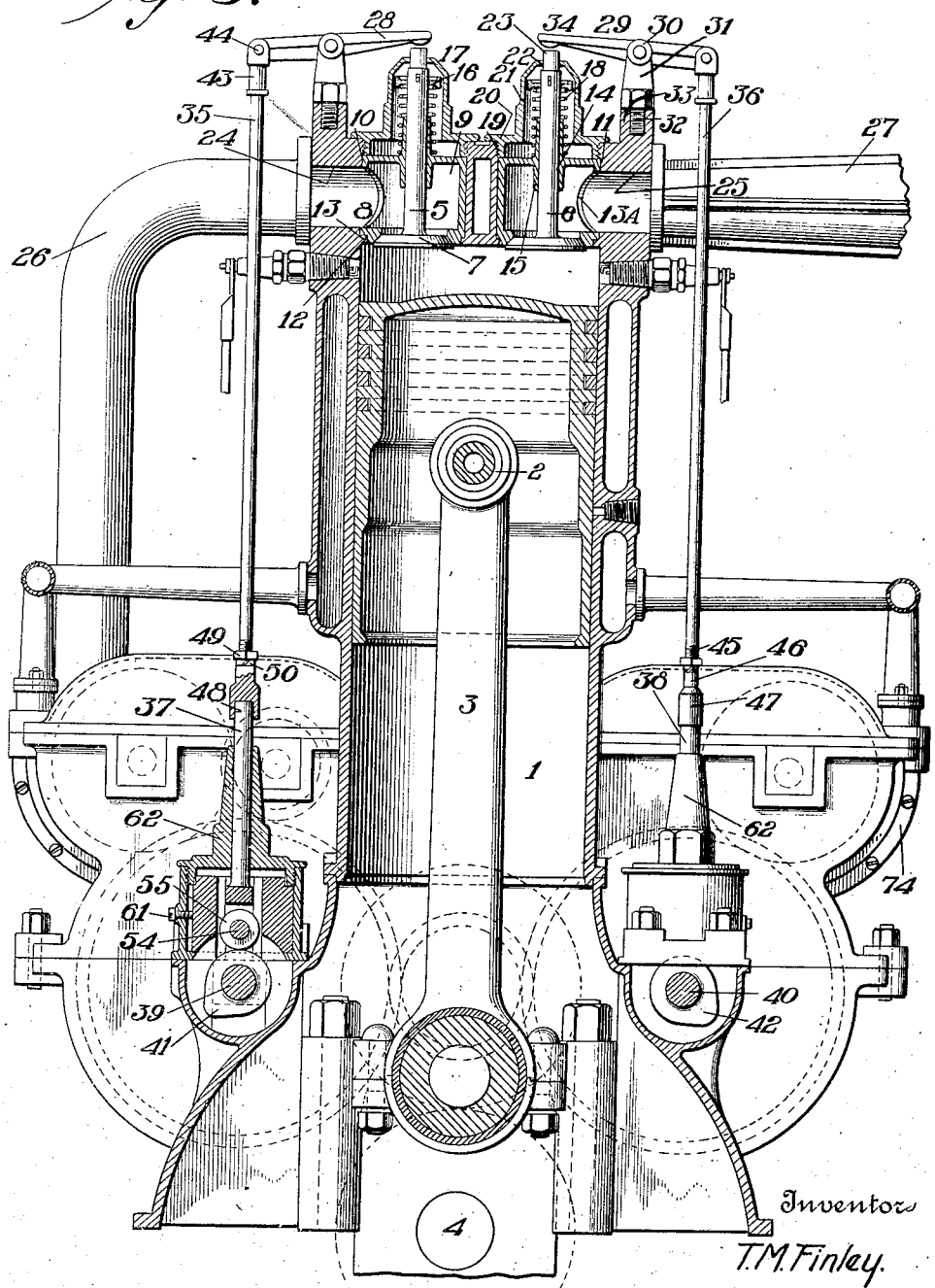
Figure 3 is a transverse sectional view of the upper portion of the tandem motor power unit, the admission cam mechanism being shown in section and the exhaust cam mechanism being shown in elevation.

Each valve consists of a head and a stem, the head being arranged at the lower end of the stem and beveled at 7 to fit a valve seat 8 of a casing 9 in which the valve is mounted. The valve casing 9 is of cylindrical form and is arranged vertically in one of the openings 10 or 11 in the upper end of the cylinder and it is provided at its lower end with a circumferential recess 12 to enable it to seat on a shoulder 13 formed by an annular flange or rib at the lower end of the openings 10 and 11. This provides a seat for the valve casing which is in the form of a removable sleeve, and the lower end of the valve casing is arranged in flush relation with the inner face of the upper end of the cylinder as clearly illustrated in Fig. 3 of the drawings. The lower end of the valve casing is open and the said valve seat surrounds the open lower end of the valve casing. Each valve casing is provided with a side opening 13ª for the inlet of the fuel charge or the exhaust of the burnt gases and the said valve casing 9 which is also provided with a top and wall has a central opening 14 therein and it is provided at the central top opening with an integral tubular guiding member or sleeve 15 through which the valve stem passes.

Each valve stem has mounted on its upper portion a flanged or dished washer 16 detachably secured on the stem by a key 17 and receiving the upper end of a coiled spring 18 interposed between the said washer and the top of the valve casing 9 and adapted to maintain the valve normally in its closed position at the limit of its upward movement with its beveled head in contact with the valve seat 8.

The washer 16 is dished at its upper and lower faces, the key being arranged within the flange formed by the upper dish of the washer and the spring having its upper end arranged in the recess formed by the lower dish of the washer. As the spring maintains a constant pressure on the lower face of the washer there will be no liability of the key 17 becoming accidentally displaced as the key is recessed at the upper edge as indicated in the drawings to enable it to interlock with the stem at the upper end of the key slot, and it is necessary to compress the spring and move the washer and key downwardly to effect a withdrawal of the key from the key slot. This may be readily done when required.

The upper ends 19 of each of the openings 10 and 11 is threaded to receive a threaded flange or portion 20 of a cap or bonnet 21 covering each opening 10 and 11 in the upper ends of the cylinders and encasing the upper portion of the valve stem and the spring, the washer 16 and the key 17. The upper end of the cap or bonnet is of tubular formation and it is enlarged at the base as shown and is provided at its upper end with an opening 22 through which the upper end of the valve stem passes. The upper portion 23 of the valve stem is preferably reduced slightly in diameter as shown.

Each cylinder is provided at the right hand side looking towards the front of the tandem motor power unit with an inlet port or opening 24 and at the left hand side with an exhaust port or opening 25, but of course the positions of the exhaust and inlet valves may be reversed. Each set of four cylinders of the tandem motor power unit is designed to be supplied with fuel from the carbureter (not shown) which is connected with the inlet ports or openings of the cylinders with an intake manifold 26 constructed as fully described in the aforesaid application and having passages of uniform length connecting the said carbureter with the cylinders so that each of the cylinders will be supplied with a uniform charge and there will be no liability of one cylinder receiving a greater charge at the expense of another cylinder or of receiving less than the full charge by reason of the same being diverted into another cylinder.

Each set of four cylinders is also equipped with an exhaust manifold 27 constructed as fully shown and described in the said application and adapted to prevent the exhaust from one cylinder interfering with the free exhaust of another cylinder. These stems of the inlet and exhaust valves are engaged by rocker arms 28 and 29 consisting of levers fulcrumed at an intermediate point at 30 in bifurcated brackets 31 having shanks 32 threaded in suitable sockets in bosses or enlargements 33 projecting vertically from the upper ends of the cylinders. The brackets or supports for the rocker arms are provided with intermediate octagonal wrench receiving portions to enable them to be readily screwed into and removed from the sockets of the projections or bosses 33. The rocker arms are provided at their inner ends with rounded portions or heads 34 for engaging the upper ends of the stems of the valves and the outer ends of the rocker arms 28 and 29 are pivotally connected to push rods 35 and 36 which are moved upwardly by cam actuated rods 37 and 38. The cam actuated rods 37 and 38 are located below and in vertical alignment with the push rods 35 and 36 and the rods 35 and 37 form connections between the rocker arm 28 and an admission cam shaft 39 and the rods 36 and 38 constitute connections between the rocker arm 29 and an exhaust cam shaft 40. The cam shafts are rotated by half-time gearing hereinafter fully described and the admission and exhaust cams 41 and 42 are set in proper position on the cam shafts 39 and 40 to operate the inlet and exhaust valves at the proper time, the firing order of the cylinders of each set being preferably 1, 3, 2 and 4, but any conventional firing order may of course be employed. The said arrangement of the firing order will produce an alternate exhaust in the sections or units of the exhaust manifold, as fully explained in the said application, to prevent any clogging of the exhaust in the passages of the exhaust manifold.

Each of the connections between the rocker arms and the cams is similar in construction and like the valve structures are removable and interchangeable. Each push rod has threaded on its upper end a sleeve 43 which is bifurcated to receive the outer end of the rocker arm to which it is connected by a pivot 44. The lower end of the push rod is threaded at 45 to receive a sleeve 46 provided with a lower enlarged portion 47 having a socket 48 to receive the upper end of the cam actuated rod. The sleeve is adjustable upwardly and downwardly with respect to the said rods by means of its threaded connection with the push rod to secure the desired opening movement of the valve with which the push rod is connected. The sleeve having the said socket 48 is secured in its adjustment by means of a nut 49 and a lock washer 50 which is interposed between the upper end of the sleeve 46 and the nut 49. Any other suitable means, however, may be employed for securing the sleeve 46 in its adjusted position and the socket connection between the push rod and the cam actuated rod will also enable the rods to be readily separated when desired. The length of the socket 48 in the said sleeve 46 will be of sufficiently greater length than the throw of the cam to prevent any accidental disengagement and permit the desired adjustment to be obtained.

Each cam actuated rod is provided at the lower end with an enlarged bifurcated head 51 slidable in a vertical opening 52 of a vertical guide sleeve 53 and provided with opposite bearings for the reception of a horizontal pivot pin 54 on which is mounted a roller 55 adapted to be engaged by a cam of one of the cam shafts. The vertical opening 52 is enlarged at an intermediate point at opposite sides 56 to provide a passage or way for the roller 55 which projects beyond the side faces of the enlarged bifurcated head or forked portion 51 of the cam actuated rod. Each cam shaft is journaled in suitable bearings 57 and the cams of each pair of valves operate in a pocket 58 in the crank case 59. The guide sleeves 53 are each provided with a vertical groove 60 for the reception of a screw 61 threaded into the cylindrical housings 62 and projecting inwardly therefrom into the said groove 60 to prevent rotary movement of the guide sleeve in the housing. Any other suitable construction may of course be employed for holding the guide sleeves against rotary movement. Also the groove 60 enables the sleeve to be readily lifted out of the cylindrical housing without entirely withdrawing the screw 61 as the groove extends from the top to the bottom of the said sleeve. Each cylindrical housing is divided with an upper tubular section 62 threaded into the cylindrical housing at 63 and having an upper guiding portion 64 for maintaining the cam actuated rod in a vertical position. The tubular section or extension 62 is flanged at its periphery to screw into the cylindrical housing and to fit over the upper edge of the same as shown. The exhaust and admission cam shafts are each preferably made in two longitudinally aligned sections, interlocking at their adjacent ends by a suitable coupling consisting of a tongue or projection 65 extending from one of the sections and fitting in a recess 66 of the adjacent cam shaft sections. This construction permits the two sections to be separated and assembled. The rotation of the cam shafts carries the cams into contact with the rollers 55 of the cam actuated rods and the friction incident to the engagement or wiping action of the cams is reduced to a minimum. The guide sleeves are provided at their lower ends with arcuate recesses 67 to provide the necessary clearance for the cams and to enable the latter to engage and lift the rollers of the vertically movable cam actuated rods.

The cam shafts are rotated by half-time gearing comprising a gear wheel 68 mounted on the outer end of the crank shaft and meshing with an idler gear 69 located centrally above the crank shaft and mounted on a subshaft 70 and connected with a pinion 71. The idler gear 69 is preferably formed integral with the pinion 71 but they may be connected in any other desired manner and the pinion 71 meshes with cam shaft gears 72 and 73 located at opposite sides of the centrally arranged pinion 71. The crank shaft gear 68 and the idler gear 69 are of the same speed ratio, namely, one to one and the speed ratio of the centrally arranged pinion 71 and the cam shaft gears 72 and 73 is one to two. This particular arrangement of gears enables smaller gears to be employed in the half-time gearing and reduces the tooth speed, and the noise and friction incident to such gearing are reduced to a minimum, while the durability and efficiency of the gearing are correspondingly increased with the decrease of the tooth speed.

Figure 4:
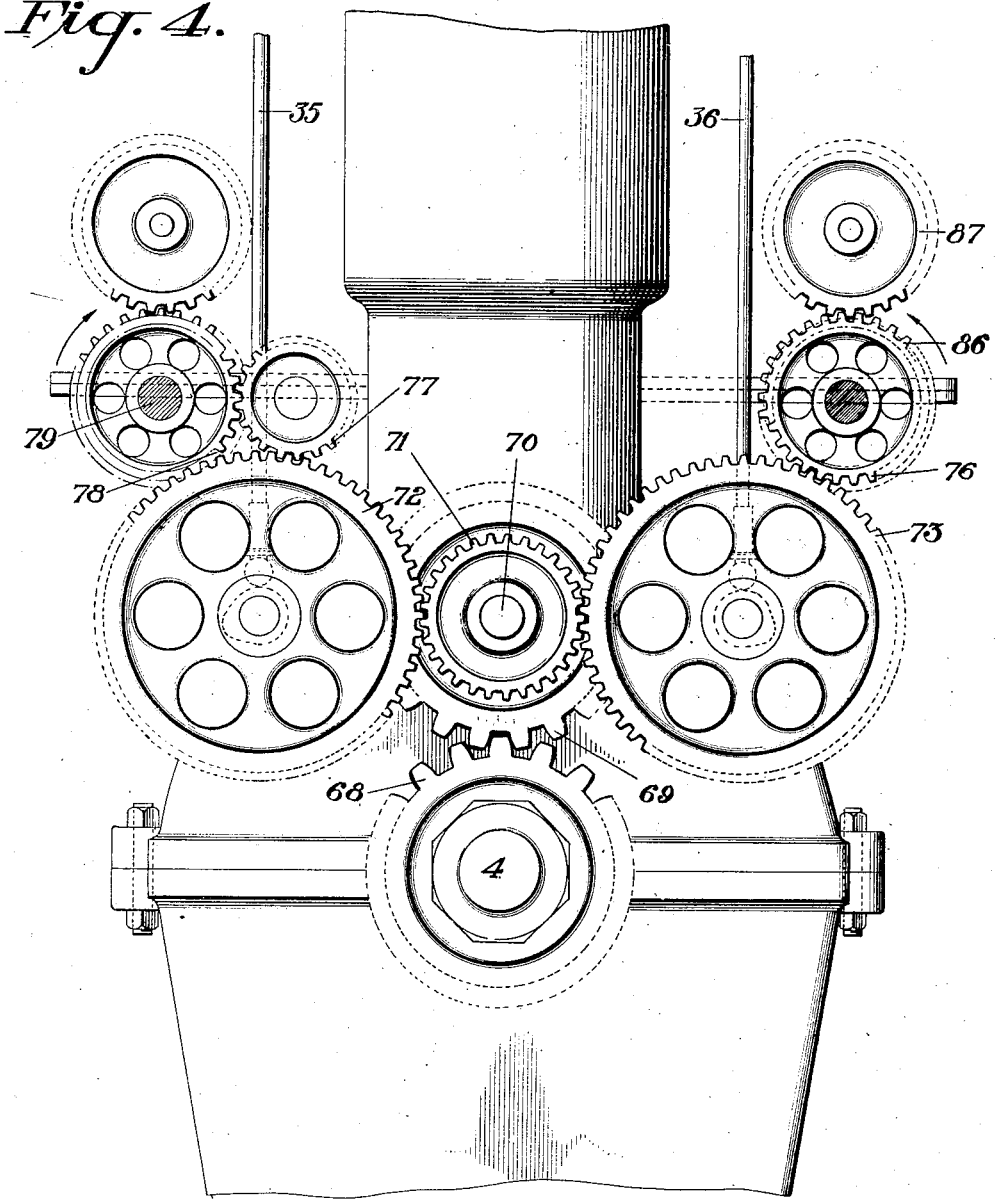
Figure 4 is a transverse sectional view illustrating the half-time gearing for transmitting motion from the crank shaft to the cam shafts and to the pumps and magnetos.
Figure 5:
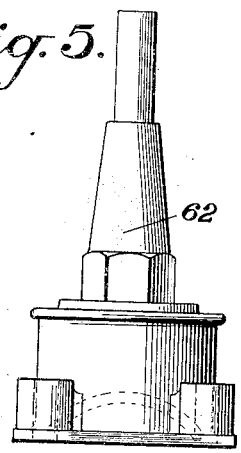
Figure 5 is an end view of one of the guides and mountings of the cam actuated rods.
Figure 6:
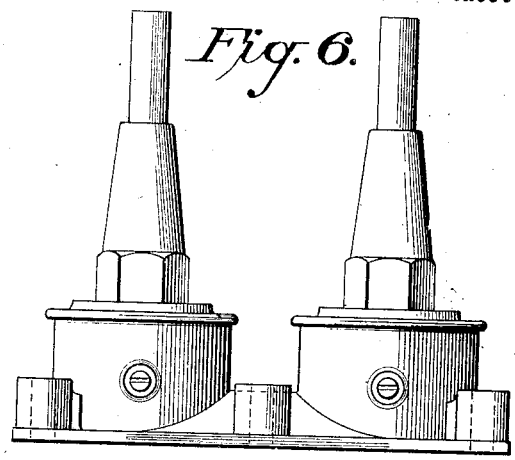
Figure 6 is a side elevation of one pair of the same.
Figure 7:
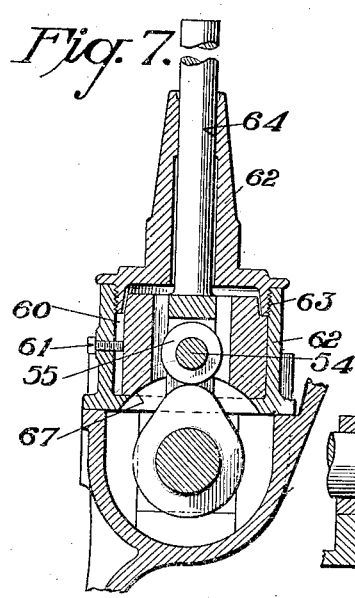
Figure 7 is a transverse sectional view illustrating the arrangement of the cams and lower portions of the cam actuated rods.
Figure 8:
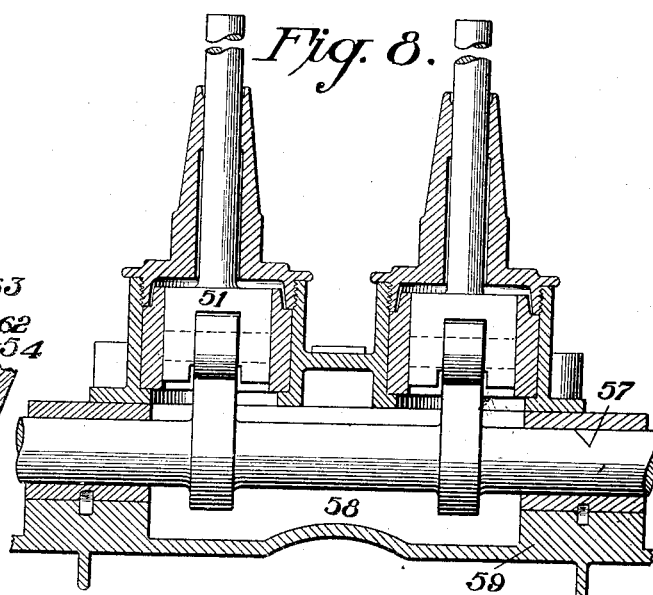
Figure 8 is a longitudinal sectional view of the same.
Figure 9:
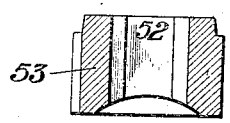
Figure 10:
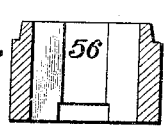
Figure 11:
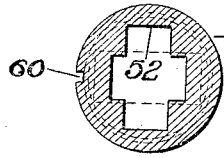
Figure 12:
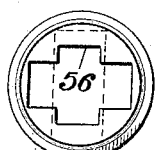

The half-time gearing is also employed for operating pumps 74 and magnetos 75 of the cooling system and ignition system of the tandem motor power unit. The cooling system constitutes the subject matter of a separate divisional application. The cam shaft gear 73 of the exhaust cam shaft meshes with a gear 76 of one of the pumps 74 and the gear 72 of the admission cam shaft meshes with an idler gear 77 and the latter meshes with a gear 78 mounted on a shaft 79 of the other pump. The gear wheels 76 rotates in the direction of the arrow in Fig. 4 of the drawing its upper portion moving inwardly in the direction of the said arrow, and the gear wheel 78 of the other pump shaft is rotated correspondingly, its upper portion also moving inwardly in the direction of the arrow in Fig. 4 owing to the employment of the idler gear 77. The gearing for operating the cam shafts and the pumps from the crank shaft is arranged within a sectional casing composed of an intermediate section 81, a bottom section 82 and a cap 83 and an upper section 84. The sectional casing is also provided with a removable face plate 85 to afford ready access to the interior of the casing. The magnetos 75 are mounted upon the sectional casing and are operated by gears 86 and 87 arranged in pairs at opposite sides of the sectional casing at the inner or rear wall thereof, exteriorly of the said casing. These magneto gears may be constructed of fiber or other suitable nonmetallic material to prevent sparking when employed on an aeronautical engine or when otherwise desired, but they may be constructed of any suitable metal and any suitable form of housing may be provided for encasing these gears. The gear 87 is mounted on the shaft of a commutator and the gear 86 is mounted on the shaft of the adjacent pump.

What is claimed is:

1. In a device of the class described, the combination of an engine provided with cylinders having inlet and exhaust valves arranged in pairs, said engine being also provided with a crank case having pockets arranged at intervals, cam shafts mounted in the crank case and provided with cams arranged in pairs and operating in the said pockets, rods directly actuated by the cams for operating the valves, housings arranged in pairs and detachably mounted on the crank case and forming covers for the said pockets, sleeves detachably arranged within the said housings and receiving and guiding the cam actuated rods, and caps covering the housings and confining the sleeves in the pockets.

2. In a device of the class described, the combination of an engine provided with cylinders having inlet and exhaust valves, said engine being also provided with a crank case provided at intervals with pockets, cam shafts having cams operating in the pockets, housings mounted on the crank case over the said pockets and provided with removable caps having exteriorly projecting tubular guiding portions, rods arranged in the guiding portions and actuated directly by the cams, and removable guide sleeves arranged within the housings and retained therein by the said caps and forming guides for the lower ends of the cam actuated rods, and means for transmitting motion from the said rods to the valves for operating the latter.

3. In a device of the class described, the combination of an engine provided with cylinders having valves, a cam shaft provided with cams, means actuated by the cams for operating the valves, said means including a rod having an enlarged bifurcated end, a roller mounted in the bifurcated end of the rod and projecting therefrom, sleeves receiving the enlarged ends of the rods and forming guides for the same and provided at opposite sides with grooves forming ways for the rollers, said sleeves being also provided at their inner ends with arcuate recesses through which the cams pass, housings detachably mounted on the engine and receiving the sleeves, and caps mounted on the housings and forming guides for the rods and confining the sleeves in the housings.

4. In a device of the class described, the combination of an engine provided with cylinders provided with valves, a cam shaft provided with cams, means actuated by the cams for operating the valves, said means including a rod having a roller arranged to be engaged by a cam of the said shaft, a guiding sleeve provided with an opening for guiding the said rod, a housing receiving the sleeve, and a detachable cap mounted on a housing and retaining the sleeve therein.

5. In a device of the class described, the combination of an engine provided with cylinders having valves, a cam shaft provided with cams, and means actuated by the cams for operating the valves, said means including a rod having an enlarged end provided with a roller arranged to be actuated by a cam of the said shaft, a cylindrical housing, a sleeve arranged within the housing and having an opening receiving and guiding the enlarged end of the rod, said sleeve being also provided with a longitudinal groove, means carried by the housing and projecting into the groove for preventing rotary movement of the said sleeve, and caps detachably mounted on the housings and covering the same and the sleeves.

6. In a device of the class described, the combination of an engine provided with cylinders having valves, a cam shaft provided with cams, and means actuated by the cams for operating the valves, said means including a rod provided with a roller engaged and actuated by a cam of the said shaft, a sleeve receiving the lower end of the rod and guiding and holding the same against rotary movement, a housing for the said sleeve and a cap mounted on the housing and retaining the sleeve therein and provided with a tubular portion forming a guide for the upper portion of the rod.

7. In a device of the class described, the combination of an engine provided with cylinders having valves, a cam shaft provided with cams, and means actuated by the cams for operating the valves, said means including a rod having a roller arranged to be engaged by a cam of the said shaft, a sleeve receiving and guiding the lower end of the said rod, a cylindrical housing in which the sleeve is removably arranged, said housing having means to prevent rotary movement of the sleeve, and a cap detachably secured to the housing and retaining the sleeve therein and provided with a tubular extension forming a guide for the upper portion of the rod.

8. In a device of the class described, the combination of a cylinder provided with valves, said engine being also provided with a crank case having approximately semi-cylindrical pockets, a cam shaft having cams operating in the said pockets, and means for operating the valves including a rod having a roller arranged to be engaged by a cam of the said shaft, a sleeve guiding the said rod and holding the same against rotary movement, a substantially cylindrical housing located above each of the said pockets and removably supporting the said sleeve, and a detachable cap for the housing having a tubular portion forming a guide for the said rod.

9. In a device of the class described, the combination of a cylinder provided with valves, a cam shaft having cams, and means actuated by the cams for operating the valves including an upper push rod, a lower cam actuated rod, a sleeve threaded on the lower end of the push rod, housings receiving and guiding the cam actuated rods and an exteriorly arranged socket having smooth interiors and slidably and detachably receiving the upper end of the cam actuated rod and means for locking the sleeve in its adjusted position.

10. In a device of the class described, the combination of an engine having a crank shaft and provided with cam shafts located at opposite sides of the cylinders of the engine, a crank shaft gear, an idler gear of the same speed ratio as and actuated by the crank shaft gear, half-time gears located at opposite sides of the idler gear and actuated by the same and mounted on cam shafts, pumps provided with gears one of the gears meshing directly with one of the half-time gears and an idler gear interposed between the other pump gear and half-time gear.

11. In a device of the class described, the combination of an engine having a crank shaft and provided with cam shafts located at opposite sides of the cylinders of the engine, a crank shaft gear, an idler gear of the same speed ratio as and meshing with the crank shaft gear, half-time gears mounted on the cam shafts and actuated by the idler gear, pumps provided with gears actuated by the cam shaft gears, and magnetos, and gearing connecting the magnetos with the pumps.

12. In a device of the class described, the combination of an engine having a crank shaft and provided with cam shafts located at opposite sides of the cylinders of the engine, a crank shaft gear, an idler gear of the same speed ratio as and actuated by the crank shaft gear, half-time gears mounted on the cam shafts and actuated by the idler gear, pumps having shafts provided with gears, one of the gears meshing directly with one of the half-time gears, an idler gear interposed between the other half-time gear and the other pump gear, magnetos and gears connecting the magnetos with the pump shafts.

13. In a device of the class described the combination of an engine having a crank shaft and provided with spaced cam shafts, a half time gearing including a crank shaft gear and idler gear of the same speed ratio as and meshing with the crank shaft gear, a pinion concentric with and connected to the idler gear and of less diameter than the same, and half time gears meshing with the pinion and having a two to one ratio to the same and actuating the cam shafts, said idler gear and pinion operating to reduce the size and tooth speed of the gears of the half time gearing.

In testimony whereof we affix our signatures.

THOMAS MILTON FINLEY.
ALLEN W. BROWN.